United States Patent
Kuo et al.

(10) Patent No.: US 11,249,898 B1
(45) Date of Patent: Feb. 15, 2022

(54) DATA MERGE METHOD, MEMORY STORAGE DEVICE AND MEMORY CONTROL CIRCUIT UNIT

(71) Applicant: PHISON ELECTRONICS CORP., Miaoli (TW)

(72) Inventors: Che-Yueh Kuo, New Taipei (TW); Ching-Yu Pan, Taichung (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/031,910

(22) Filed: Sep. 25, 2020

(30) Foreign Application Priority Data

Sep. 4, 2020 (TW) .................................. 109130306

(51) Int. Cl.
*G06F 12/02* (2006.01)
*G06F 12/0873* (2016.01)
*G06F 12/0817* (2016.01)
*G06F 12/0891* (2016.01)

(52) U.S. Cl.
CPC ...... *G06F 12/0246* (2013.01); *G06F 12/0822* (2013.01); *G06F 12/0873* (2013.01); *G06F 12/0891* (2013.01); *G06F 2212/7201* (2013.01); *G06F 2212/7209* (2013.01)

(58) Field of Classification Search
CPC ............. G06F 12/0246; G06F 12/0822; G06F 12/0873; G06F 12/0891; G06F 2212/7201; G06F 2212/7209
See application file for complete search history.

(56) References Cited

U.S. PATENT DOCUMENTS

| 10,620,874 | B2* | 4/2020 | Yan ........................ G06F 3/0655 |
| 2011/0055458 | A1* | 3/2011 | Kuehne ............... G06F 12/0246 711/103 |
| 2011/0225346 | A1* | 9/2011 | Goss .................... G06F 11/3034 711/103 |
| 2013/0013853 | A1* | 1/2013 | Yeh ...................... G06F 12/0246 711/103 |
| 2013/0019049 | A1* | 1/2013 | Yeh ...................... G06F 12/0246 711/103 |
| 2013/0054877 | A1* | 2/2013 | Yeh ...................... G06F 12/0246 711/103 |
| 2013/0067141 | A1* | 3/2013 | Yeh ........................ G11C 29/82 711/103 |

(Continued)

*Primary Examiner* — Prasith Thammavong
(74) *Attorney, Agent, or Firm* — JCIPRNET

(57) ABSTRACT

A data merge method for a rewritable non-volatile memory module including a plurality of physical units is provided. The method includes: selecting at least one first physical unit and at least one second physical unit from the physical units; reading first mapping information from the rewritable non-volatile memory module, and the first mapping information includes mapping information of the first physical unit and mapping information of the second physical unit; copying valid data collected from the first physical unit and valid data collected from the second physical unit to at least one third physical unit of the physical units according to the first mapping information; and when a data volume of valid data copied from the second physical unit to the third physical unit reaches a data volume threshold, stopping collecting valid data from the second physical unit, and continuing collecting valid data from the first physical unit.

21 Claims, 10 Drawing Sheets

(56) References Cited

U.S. PATENT DOCUMENTS

| | | | |
|---|---|---|---|
| 2013/0254461 A1* | 9/2013 | Tan | G06F 12/0246 |
| | | | 711/103 |
| 2016/0321171 A1* | 11/2016 | Kanno | G06F 3/0688 |
| 2018/0157586 A1* | 6/2018 | Yl | G06F 12/0246 |
| 2021/0042221 A1* | 2/2021 | Byun | G06F 12/0246 |
| 2021/0240613 A1* | 8/2021 | Na | G06F 12/0253 |

* cited by examiner

DATA MERGE METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 109130306, filed on Sep. 4, 2020. The entirety of the above-mentioned patent application is hereby incorporated by reference herein and made a part of this specification.

BACKGROUND

1. Technology Field

The disclosure relates to a flash memory technology, and more particularly, to a data merge method, a memory storage device and a memory control circuit unit.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

When the memory storage device leaves the factory, a part of physical units in the memory storage device will be configured as a plurality of spare physical units so the spare physical units can be used to store new data. After a period of use, the number of spare physical units in the memory storage device will gradually decrease. The memory storage device can execute a data merge procedure (a.k.a. a garbage collection procedure) to copy valid data from a source node to a recycling node (a.k.a. a target node) and erase the physical units belonging to the source node to release new spare physical units.

In general, in the data merge procedure, the data merge procedure is performed on the physical units storing less valid data in the source node first to ensure that valid data in the physical units storing less valid data can all be copied to the recycling node. Then, the valid data is copied from the physical unit storing more valid data in the source node to a remaining space of the recycling node. However, if a repetition rate of logical units mapped to the physical units selected as the source node becomes higher, the more tables recording management information of the logical units will be loaded as duplicates in two-stage data merge procedure. Consequently, the number of times the memory storage device is accessed may be increased to lower an overall performance of the memory storage device.

SUMMARY

The disclosure provides a data merge method, a memory storage device and a memory control circuit unit capable of solving the problems above and effectively reducing the number of times the memory storage device is accessed in the data merge procedure.

An exemplary embodiment of the disclosure provides a data merge method for a rewritable non-volatile memory module. The rewritable non-volatile memory module includes a plurality of physical units. The data merge method includes: selecting at least one first physical unit and at least one second physical unit from the physical units; reading first mapping information from the rewritable non-volatile memory module, wherein the first mapping information includes mapping information of the at least one first physical unit and mapping information of the at least one second physical unit; copying valid data collected from the at least one first physical unit and valid data collected from the at least one second physical unit to at least one third physical unit of the physical units according to the first mapping information; and when a data volume of the valid data copied from the at least one second physical unit to the at least one third physical unit reaches a data volume threshold, stopping collecting the valid data from the at least one second physical unit, and continuing collecting the valid data from the at least one first physical unit.

An exemplary embodiment of the disclosure further provides a memory storage device, which includes a connection interface unit, a rewritable non-volatile memory module and a memory control circuit unit. The connection interface unit is configured to couple to a host system. The rewritable non-volatile memory module includes a plurality of physical units. The memory control circuit unit is coupled to the connection interface unit and the rewritable non-volatile memory module. The memory control circuit unit is configured to select at least one first physical unit and at least one second physical unit from the physical units. The first mapping information includes mapping information of the at least one first physical unit and mapping information of the at least one second physical unit. The memory control circuit unit is further configured to copy valid data collected from the at least one first physical unit and valid data collected from the at least one second physical unit to at least one third physical unit of the physical units according to the first mapping information. When a data volume of the valid data copied from the at least one second physical unit to the at least one third physical unit reaches a data volume threshold, the memory control circuit unit is further configured to stop collecting the valid data from the at least one second physical unit, and continue collecting the valid data from the at least one first physical unit.

An exemplary embodiment of the disclosure further provides a memory control circuit unit, which is configured to control a rewritable non-volatile memory module. The rewritable non-volatile memory module includes a plurality of physical units. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is further configured to read first mapping information from the rewritable non-volatile memory module. The first mapping information includes mapping information of the at least one first physical unit and mapping information of the at least one second physical unit. The memory management circuit is further configured to copy valid data collected from the at least one first physical unit and valid data collected from the at least one second physical unit to at least one third physical unit of the physical units according to the first mapping information. When a data volume of the valid data copied from the at least one second physical unit to the at least one third physical unit reaches a data volume threshold, the memory management circuit is further configured to stop collecting the valid data from the at least one second physical unit, and continue collecting the valid data from the at least one first physical unit.

Based on the above, the memory management circuit can utilize the mapping information shared by the at least one first physical unit and the at least one second physical unit to simultaneously copy the valid data in the at least one first physical unit and the at least one second physical unit to the at least one third physical unit of the recycling node, and limit the data volume of the valid data copied from the at least one second physical unit having relatively large data volume in the source node to the recycling node by setting the data volume threshold, so as to prevent the logical-physical mapping tables used for accessing the at least one first physical unit and the at least one second physical unit from being read as duplicates in the data merge operation. As a result, the number of times the memory storage device is accessed in the data consolidation operation can be effectively reduced, thereby improving the overall operating performance of the memory storage device.

To make the aforementioned more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

DESCRIPTION OF THE EMBODIMENTS

Figure 1:
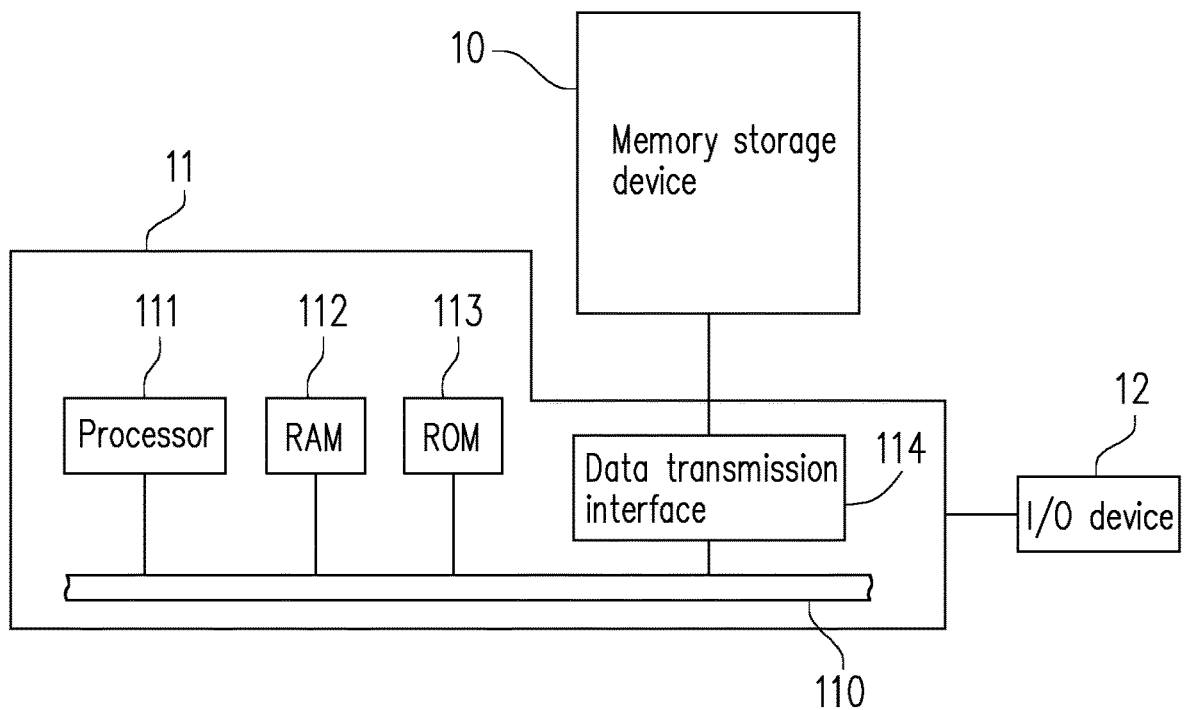
FIG. 1 is a schematic diagram illustrating a host system, a memory storage device and an I/O (input/output) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the disclosure may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
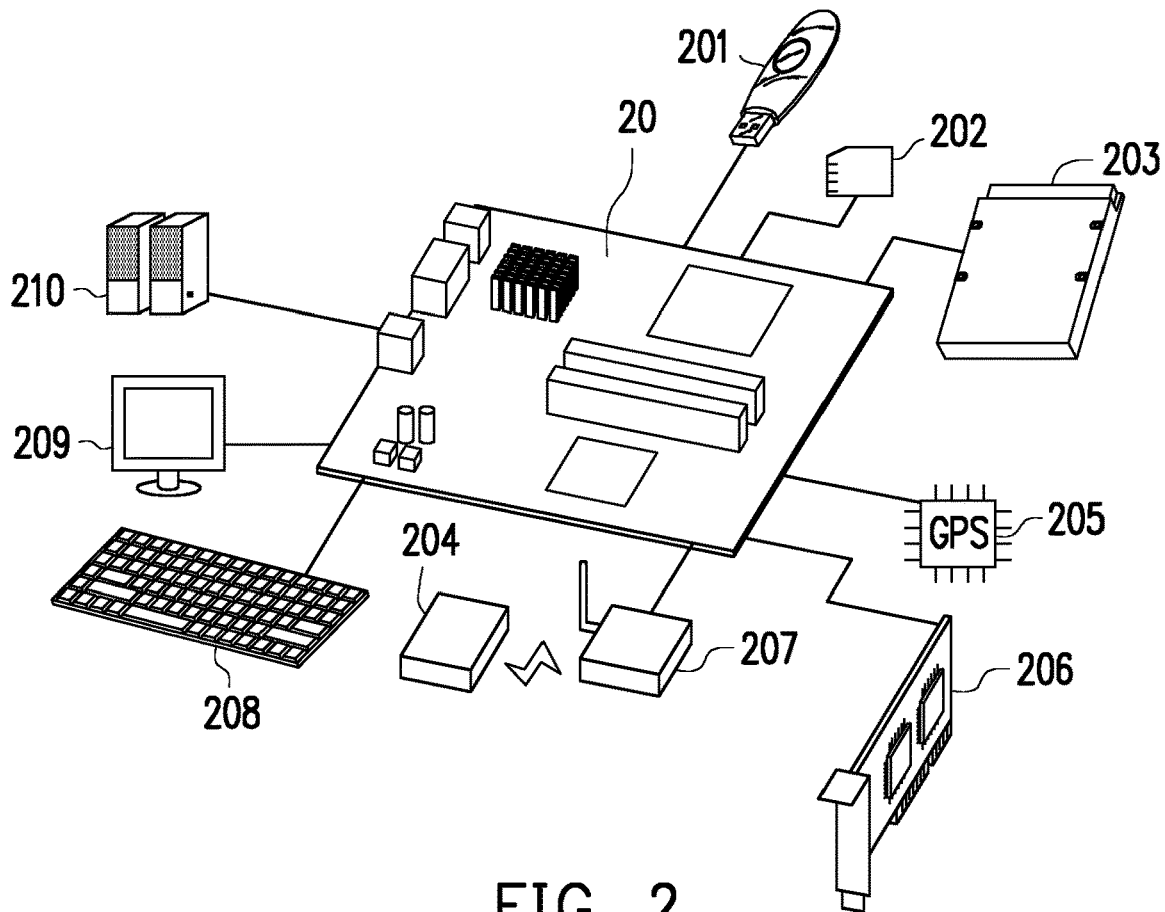
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
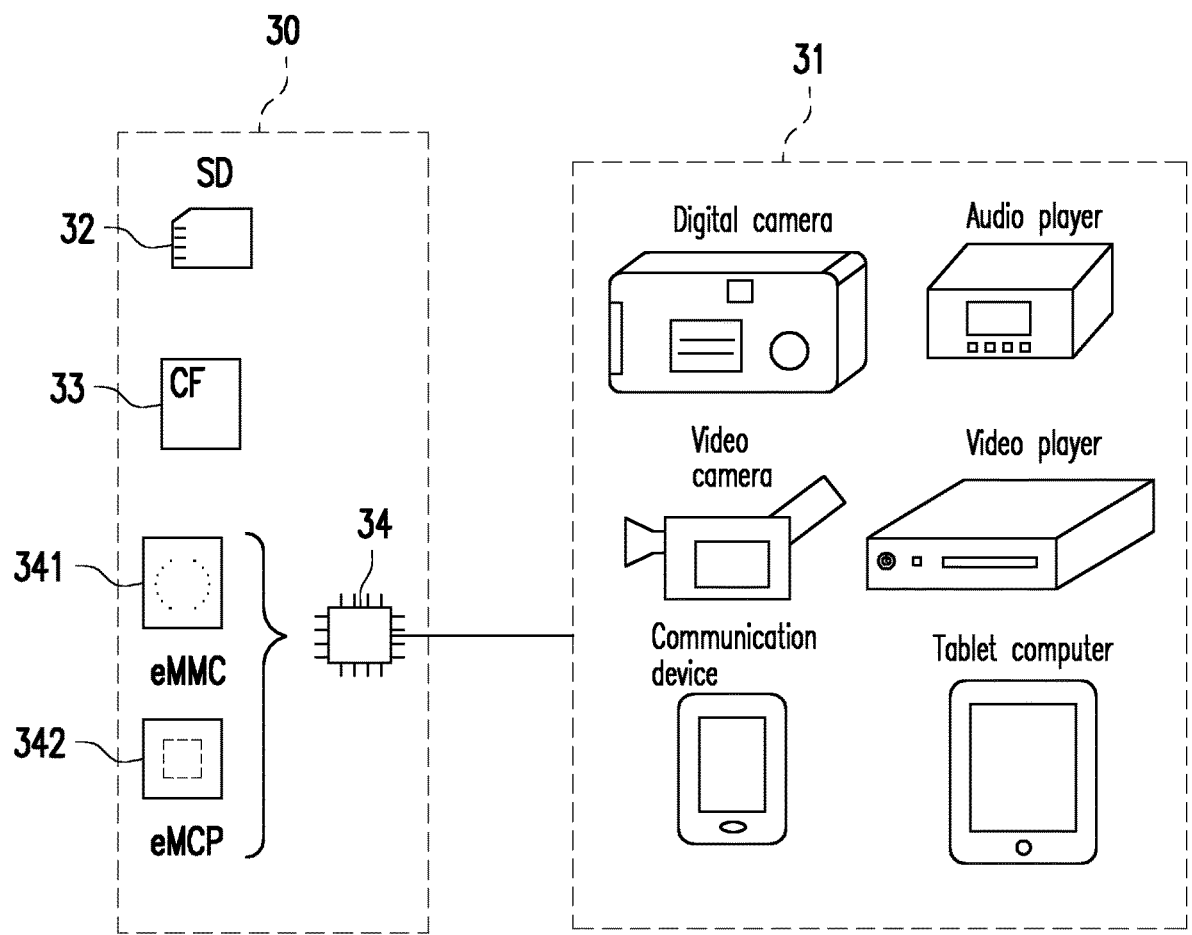
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
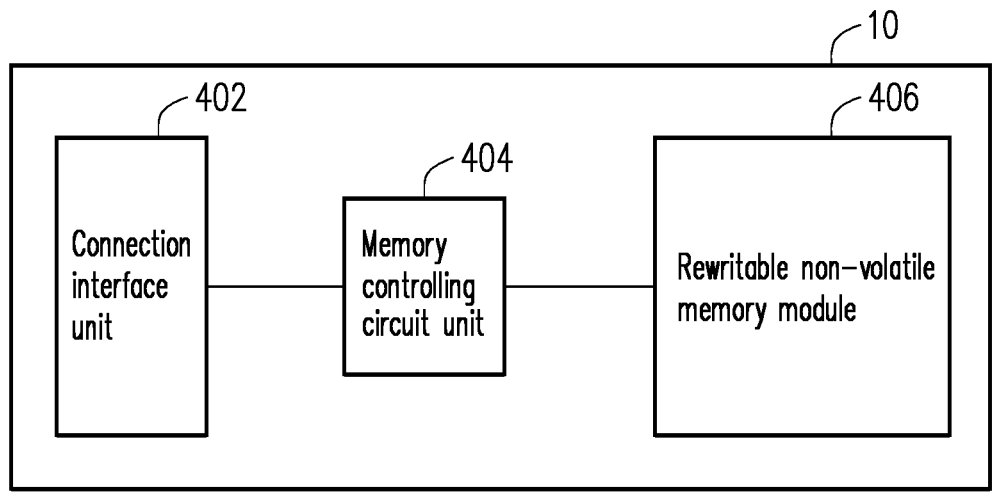
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. The memory storage device 10 can communicate with the host system 11 through the connection interface unit 402. In this exemplary embodiment, the connection interface unit 402 is compatible with a SATA (Serial Advanced Technology Attachment) standard. Nevertheless, it should be understood that the disclosure is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a Quad Level Cell (MLC) NAND-type flash memory module (i.e., a flash memory module capable of storing four bits in one memory cell), other flash memory modules or other memory modules having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". With changes in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 may constitute a plurality of physical programming units, and the physical programming units can constitute a plurality of physical erasing units. Specifically, the memory cells on the same word line may constitute one or more of the physical programming units. If each of the memory cells can store two or more bits, the physical programming units on the same word line may be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units may include a data bit area and a redundancy bit area. The data bit area contains multiple physical sectors configured to store user data, and the redundancy bit area is configured to store system data (e.g., management data such as an error correcting code, etc.). In this exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
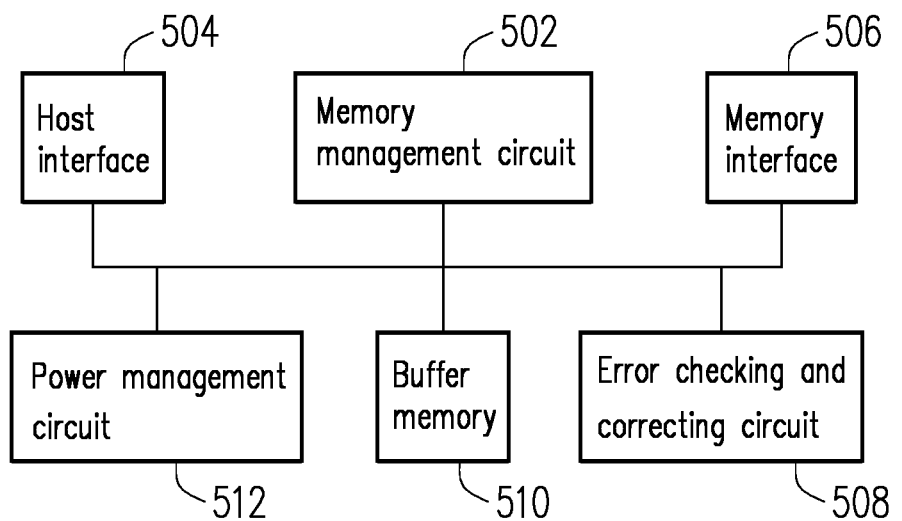
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. When the memory storage device 10 operates, the control commands are executed by the microprocessor to execute operations of writing, reading or erasing data.

In another exemplary embodiment, the control commands of the memory management circuit 502 may also be stored as program codes in a specific area (e.g., the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to execute operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of a memory cell group of the rewritable non-volatile memory module 406. The memory writing circuit is configured to issue a write command sequence for the rewritable non-volatile memory module 406 to write data into the rewritable non-volatile memory module 406. The memory reading circuit is configured to issue a read command sequence for the rewritable non-volatile memory module 406 to read data from the rewritable non-volatile memory module 406. The memory erasing circuit is configured to issue an erase command sequence for the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and the data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. Nevertheless, it should be understood that the disclosure is not limited in this regard. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence;

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to execute an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 executes the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

In an exemplary embodiment, the rewritable non-volatile memory module 406 of FIG. 4 is also known as a flash memory module; the memory control circuit unit 404 is also known as a flash memory controller for controlling the flash memory module; and/or the memory management circuit 502 of FIG. 5 is also known as a flash memory management circuit.

Figure 6:
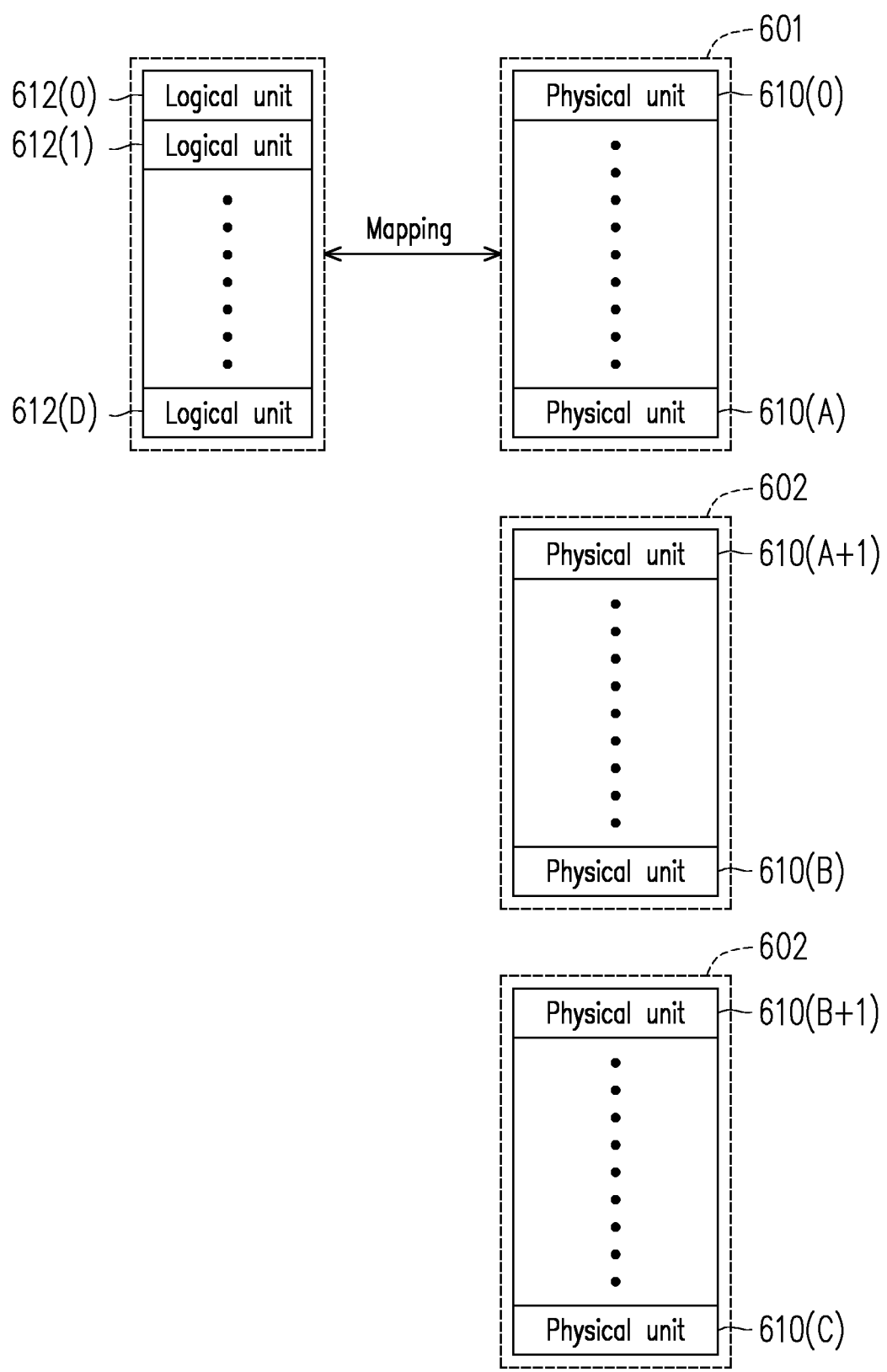
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure.

Referring to FIG. 6, the memory management circuit 502 can logically group physical units 610(0) to 610(C) of the rewritable non-volatile memory module 406 into a storage area 601, a spare area 602 and a system area 603. The physical units 610(0) to 610(A) in the storage area 601 are stored with data. For example, the physical units 610(0) to 610(A) in the storage area 601 can store valid data and invalid data. The physical units 610(A+1) to 610(B) in the spare area 602 are not used to store data (e.g., the valid data). The physical units 610(B+1) to 610(C) in the system area 603 are configured to store system data, such as a logical-to-physical mapping table, a bad block management table, a device model or management data of other types.

The memory management circuit 502 can select one physical unit from the physical units 610(A+1) to 610(B) in the spare area 602 and stores data from the host system 11 or at least one physical unit in the storage area 601 into the selected physical unit. Meanwhile, the selected physical unit is then associated with the storage area 601. In addition, after one physical unit in the storage area 601 is erased, that erased physical unit is then re-associated with the spare area 602.

In this exemplary embodiment, each physical unit belonging to the storage area 601 is also known as a non-spare physical unit, and each physical unit belonging to the spare area 602 is also known as a spare physical unit. In this exemplary embodiment, one physical unit refers to one physical erasing unit. However, in another exemplary embodiment, one physical unit may also include a plurality of physical erasing units.

The memory management circuit 502 can assign logical units 612(0) to 612(D) for mapping to the physical units 610(0) to 610(A) in the storage area 601. In this exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(D) may be mapped to one or more physical units. It should be noted that, the memory management circuit 502 may not assign logical units for mapping to the system area 603, so as to prevent the system data stored in the system area 603 from being changed by users.

The memory management circuit 502 records mapping information (a.k.a. logical-to-physical mapping information) between the logical units and the physical units into at least one logical-to-physical mapping table. The mapping information can reflect a mapping relation between one specific physical unit and one specific logical unit in the storage area 601. The logical-to-physical mapping table is stored in the physical units 610(B+1) to 610(C) in the system area 603. The memory management circuit 502 can perform a data access operation on the memory storage device 10 according to the logical-to-physical mapping table. For example, the memory management circuit 502 can obtain the mapping relation between one specific physical unit and one specific logical unit in the storage area 601 according to one specific logic-to-physical mapping table. The memory management circuit 502 can access the physical unit according to the mapping relation.

In this exemplary embodiment, the valid data is the latest data belonging to one specific logical unit, and the invalid data is the latest data not belonging to any logical unit. For example, if the host system 11 stores new data into one specific logical unit to overwrite old data originally stored in that specific logical unit (i.e., update the data of that specific logical unit), this new data stored in the storage area 601 is the latest data belonging to that logical unit and marked as valid, whereas the old data being overwritten may still be stored in the storage area 601 but marked as invalid.

In this exemplary embodiment, if data belonging to one logical unit is updated, a mapping relation between that logical unit and the physical unit stored with the old data belonging to that logical unit is removed, and a mapping relation between that logical unit and the physical unit stored with the latest data belonging to that logical unit is established. However, in another exemplary embodiment, if data belonging to one logical unit is updated, a mapping relation between that logical unit and the physical unit stored with the old data belonging to that logical unit may still be maintained.

When the memory storage device 10 leaves the factory, a total number of the physical units belonging to the spare area 602 is a predetermined number (e.g., 30). During operation of the memory storage device 10, there will be increasingly more physical units being selected from the spare area 602 and then associated with the storage area 601 for storing data (e.g., the user data from the host system 11). Accordingly, the total number of the physical units belonging to the spare area 602 may gradually decrease with use of the memory storage device 10 over time.

During operation of the memory storage device 10, the memory management circuit 502 can continuously update the total number of the physical units belonging to the spare area 602. The memory management circuit 502 can perform a data merge operation according to a number of the physical units in the spare area 602 (i.e., a total number of the spare physical units). For example, the memory management circuit 502 can determine whether the total number of the physical units belonging to the spare area 602 is less than or equal to a threshold (a.k.a. a first threshold). The first threshold may be, for example, 2 or a greater value (e.g., 10), which is not particularly limited by the disclosure. If the total number of the physical units belonging to the spare area 602 is less than or equal to the first threshold, the memory management circuit 502 can perform the data merge operation. In an exemplary embodiment, the data merge operation is also known as a garbage collection operation.

In the data merge operation, the memory management circuit 502 can select at least one physical unit from the storage area 601 as a source node. The memory management circuit 502 can copy the valid data from the selected physical unit (i.e., the source node) to at least one physical unit served as a recycling node. The physical unit used for storing the copied valid data (i.e., the recycling node) is selected from the spare area 602 and then associated with the storage area 601. After the valid data stored by one physical unit is completely copied to the recycling node, that physical unit may then be erased and associated with the spare area 602. In an exemplary embodiment, an operation of re-associating one physical unit from the storage area 601 back to the spare area 602 (or an operation of erasing one physical unit) is also known as releasing one spare physical unit. By performing the data merge operation, one or more spare physical units will be released so the total number of the physical units belonging to the spare area 602 can gradually increase.

After the data merge operation is started, if the physical units belonging to the spare area 602 match a specific condition, the data merge operation may be then stopped. For example, the memory management circuit 502 can determine whether the total number of the physical units belonging to the spare area 602 is greater than or equal to one threshold (a.k.a. a second threshold). For example, the second threshold can be greater than or equal to the first threshold. If the total number of the physical units belonging to the spare area 602 is greater than or equal to the second threshold, the memory management circuit 502 can stop the data merge operation. It should be noted that, stopping the data merge operation means ending the data merge operation currently in process. After the data merge operation is stopped, if the total number of the physical units belonging to the spare area 602 is less than or equal to the first threshold again, the next data merge operation may be performed again to release the new physical units.

Figure 7A:
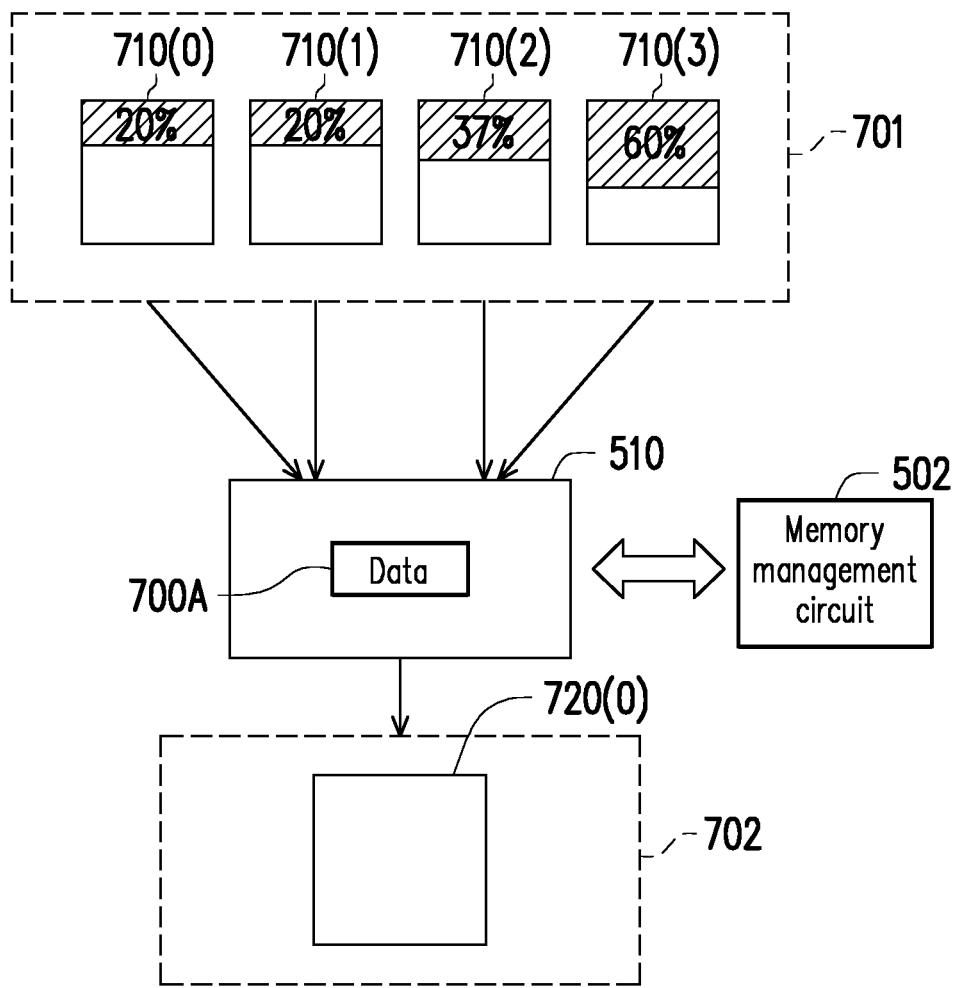
FIG. 7A to FIG. 7C are schematic diagrams illustrating a data merge operation according to an exemplary embodiment of the disclosure.
Figure 7B:
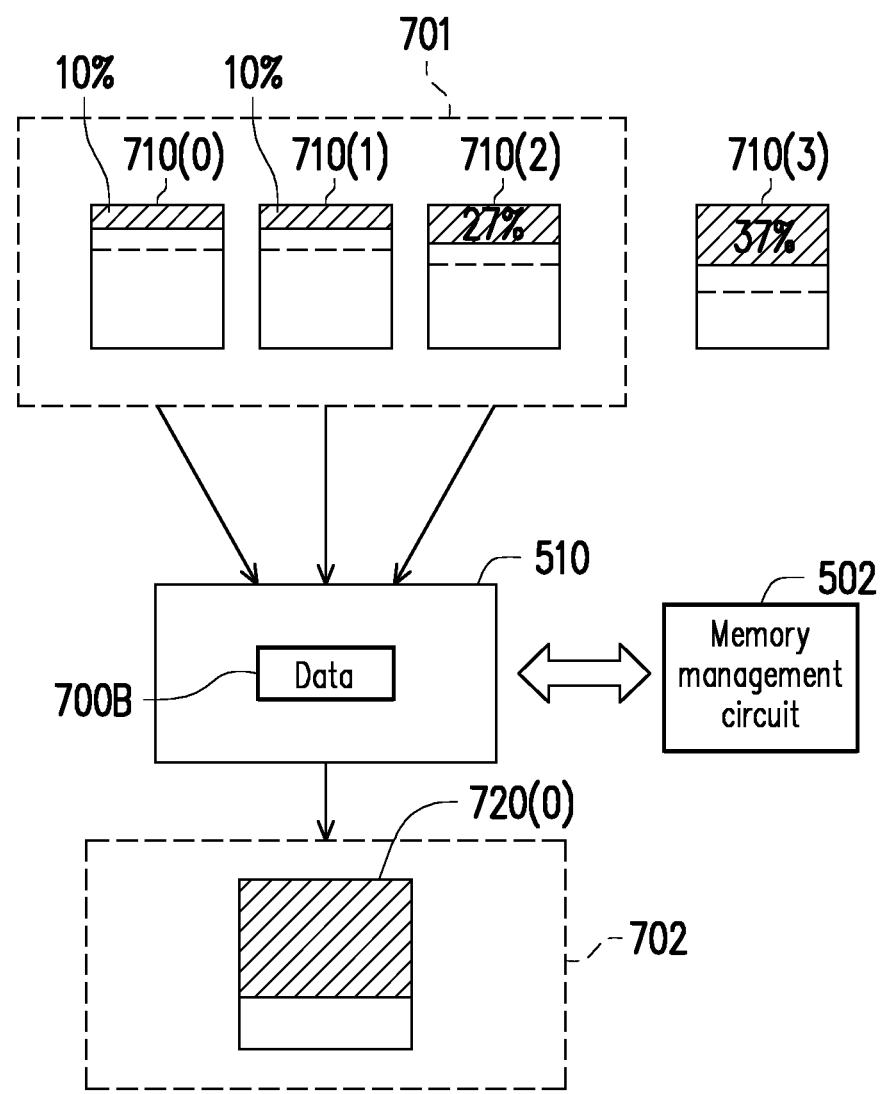
Figure 7C:
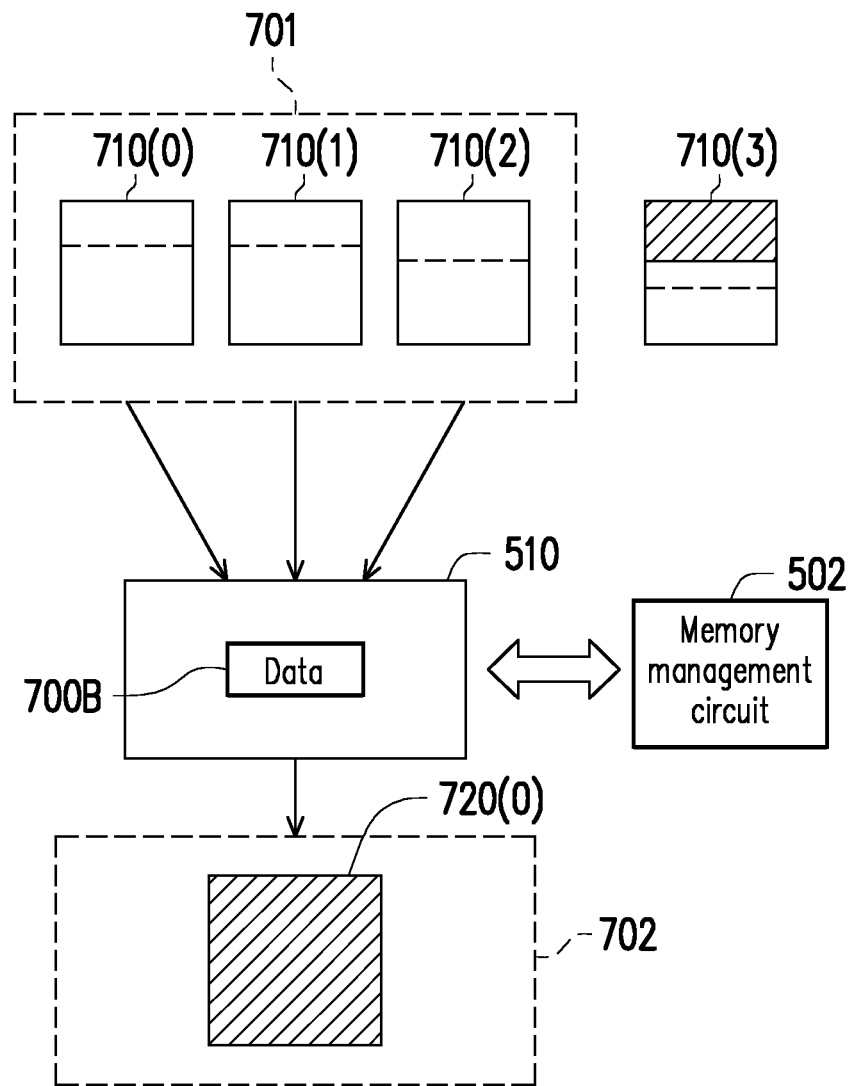

FIG. 7A to FIG. 7C are schematic diagrams illustrating a data merge operation according to an exemplary embodiment of the disclosure.

Referring to FIG. 7A, in the data merge operation of this exemplary embodiment of the disclosure, the memory management circuit 502 selects a plurality of physical units 710(0) to 710(3) from the physical units of the storage area 601 in the rewritable non-volatile memory module 406 as a source node 701, and selects a physical unit 720(0) (a.k.a. at least one third physical unit 720(0)) from the physical units of the spare area 602 as a recycling node 702. In particular, in this exemplary embodiment, the selected physical units 710(0) to 710(3) includes the physical units 710(0) to 710(2) with relatively small data volume of valid data in the source node 701 (a.k.a. at least one first physical unit 710(0) to 710(2)) and the physical unit 710(3) with relatively large data volume of valid data in the source node 701 (a.k.a. at least one second physical unit 710(3)). In other words, a data volume of valid data in each of the at least one first physical unit 710(0) to 710(2) is less than a data volume of valid data in each of the at least one second physical unit 710(3).

Then, the memory management circuit 502 reads mapping information (a.k.a. first mapping information) shared by the at least one first physical unit 710(0) to 710(2) and the at least one second physical unit 710(3) from the rewritable non-volatile memory module 406. That is to say, the first mapping information include mapping information of the at least one first physical unit 710(0) to 710(2) and mapping information of the at least one second physical unit 710(3). According to the first mapping information, the memory management circuit 502 identifies valid data in the at least one first physical unit 710(0) to 710(2) and valid data in the at least one second physical unit 710(3), and collect valid data 700A from the at least one first physical unit 710(0) to 710(2) and the at least one second physical unit 710(3) served as the source node 701, so as to temporarily store the valid data 700A into the buffer memory 510. Then, the memory management circuit 502 can write the valid data 700A into the at least one third physical unit 720(0) served as the recycling node 702. That is to say, the memory management circuit 502 copies the valid data collected from the at least one first physical unit 710(0) to 710(2) of the source node 701 and the valid data collected from the at least one second physical unit 710(3) of the source node 701 to the at least one third physical unit 720(0) of the recycling node 702.

In an exemplary embodiment, when a data volume of the valid data copied from the at least one second physical unit 710(3) of the source node 701 to the at least one third physical unit 720(0) reaches a data volume threshold, the memory management circuit 502 stops collecting the valid data from the at least one second physical unit 710(3) of the source node 701, and continues collecting the valid data from the at least one first physical unit 710(0) to 710(2) of the source node 701. Specifically, a data volume that a size of the at least one third physical unit 720(0) of the recycling node 702 can contain is a target data volume, and the data volume threshold is a remaining data volume obtained by subtracting a total data volume of valid data in the at least one first physical unit 710(0) to 710(2) from the target data volume. In other words, in the data merge operation of the disclosure, the memory management circuit 502 reserves enough space in the at least one third physical unit 720(0) of the recycling node 702 so that the valid data in the at least one first physical unit 710(0) to 710(2) can all be copied to the recycling node 702, and only the valid data with the remaining data volume in at least one second physical unit 710(3) are copied to the recycling node 702. In other words, in this exemplary embodiment of the disclosure, a data volume (a.k.a. a first data volume) of the valid data collected from the at least one first physical unit 710(0) to 710(2) is equal to a total data volume of valid data in the at least one first physical unit 710(0) to 710(2), and a data volume (a.k.a. a second data volume) of the valid data collected from the at least one second physical unit 710(3) is less than a total data volume of valid data in the at least one second physical unit 710(3). Also, a sum of the first data volume and the second data volume is the size of the at least one third physical unit.

Figure 8:
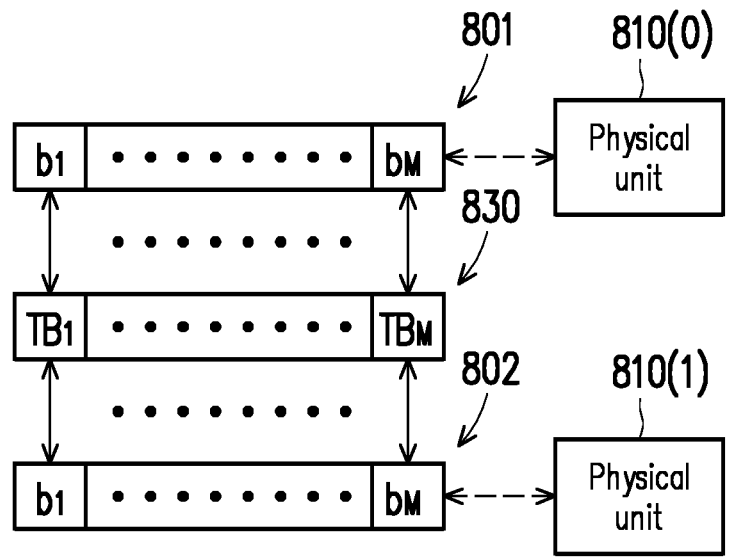
FIG. 8 is a schematic diagram illustrating table mapping information according to an exemplary embodiment of the disclosure

It should be noted that, in the operation that the memory management circuit 502 reads the first mapping information shared by the at least one first physical unit 710(0) to 710(2) and the at least one second physical unit 710(3) from the rewritable non-volatile memory module 406, the memory management circuit 502 obtains the first mapping information according table mapping information (a.k.a. first table mapping information) of the at least one first physical unit 710(0) to 710(2) and table mapping information (a.k.a. second table mapping information) of the at least one second physical unit 710(3). Referring to FIG. 8, how to obtain the mapping information shared between the physical units will be described below.

FIG. 8 is a schematic diagram illustrating table mapping information according to an exemplary embodiment of the disclosure Referring to FIG. 8, table mapping information 801 corresponds to a physical unit 810(0), and table mapping information 802 corresponds to a physical unit 810(1). A logical-to-physical mapping table 830 may be stored in the system area 603 of FIG. 6. The logical-to-physical mapping table 830 includes logical-to-physical mapping tables $TB_1$ to $TB_M$. The logical-to-physical mapping tables $TB_1$ to $TB_M$ are respectively configured to record logical-to-physical mapping information of at least one logical unit within a certain number range.

The table mapping information 801 can reflect that the logical-to-physical mapping information of the logical unit mapped to the physical unit 810(0) is stored in at least one of the logical-to-physical mapping tables $TB_1$ to $TB_M$. The table mapping information 802 can reflect that the logical-to-physical mapping information of the logical unit mapped to the physical unit 810(1) is stored in at least one of the logical-to-physical mapping tables $TB_1$ to $TB_M$. For example, the table mapping information 801 and 802 may both have bits $b_1$ to $b_M$. A value of a bit $b_i$ may be 0 or 1 to reflect whether a logical-to-physical mapping table $TB_1$ is used. The value i is between 1 and M.

In an exemplary embodiment, if the physical unit 810(0) is mapped to the logical units 612(1) and 612(3) of FIG. 6, the values of the bits $b_1$ and $b_3$ in the table mapping information 801 may be 1 (the rest of the bits may be 0) to reflect that the logical-physical mapping information of the logical unit 612(1) and 612(3) are recorded in the logical-physical mapping tables $TB_1$ and $TB_3$. The logical-to-physical mapping tables $TB_1$ and $TB_3$ may be loaded into the buffer memory 510 of FIG. 5 to access the physical unit 810(0). In addition, if the physical unit 810(1) is mapped to the logical units 612(1), 612(3) and 612(8) of FIG. 6, the values of the bits $b_1$, $b_3$ and $b_1$ in the table mapping information 802 may be 1 (the rest of the bits may be 0) to reflect that the logical-physical mapping information of the logical units 612(1), 612(3) and 612(8) are stored in the logical-physical mapping tables $TB_1$, $TB_3$ and $TB_8$. The logical-to-physical mapping tables $TB_1$, $TB_3$ and $TB_8$ may be loaded into the buffer memory 510 to access the physical unit 810(1).

In the foregoing exemplary embodiment, the bits $b_1$ and $b_3$ in both the table mapping information 801 and 802 being 1 indicate that the logical-physical mapping tables $TB_1$ and $TB_3$ in the logical-physical mapping tables for accessing the physical units 810(0) and 810(1) are duplicates. When the physical unit 810(0) is to be accessed, the logical-to-physical mapping tables $TB_1$ and $TB_3$ may be loaded into the buffer memory 510 to query the related mapping information. Next, if the physical unit 810(1) is to be accessed, it only needs to additionally load the logical-to-physical mapping table $TB_8$.

In the exemplary embodiment of FIG. 7A, the memory management circuit 502 can obtain the first mapping information according the first table mapping information corresponding to the at least one first physical unit 710(0) to 710(2) and the second table mapping information corresponding to the at least one second physical unit 710(3). As illustrated in FIG. 8, the first table mapping information can reflect which logical-to-physical mapping tables (a.k.a. at least one first logical-physical mapping table) the mapping information of the at least one first physical unit is recorded in, and the second table mapping information can reflect which logical-to-physical mapping tables (a.k.a. at least one second logical-physical mapping table) the mapping information of the at least one second physical unit is recorded in. Therefore, the first mapping information obtained through the first table mapping information and the second table mapping information reflects overlapping information between the at least one first logical-to-physical mapping table and the at least one second logical-to-physical mapping table, and the memory management circuit 502 can read the logical-physical mapping tables shared by the at least one first physical unit 710(0) to 710(2) and the at least one second physical unit 710(3) according to the overlapping information.

Figure 9A:
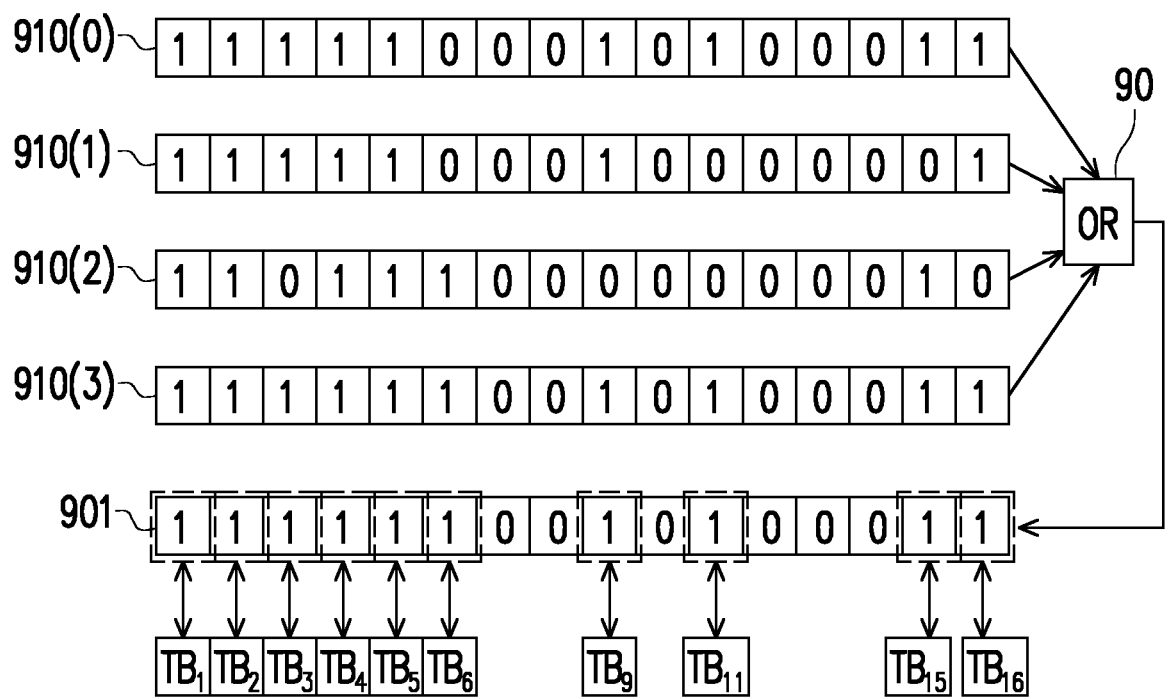
FIG. 9A and FIG. 9B are schematic diagrams for obtaining logical-to-physical mapping tables according to mapping information illustrated according to an exemplary embodiment of the disclosure.
Figure 9B:
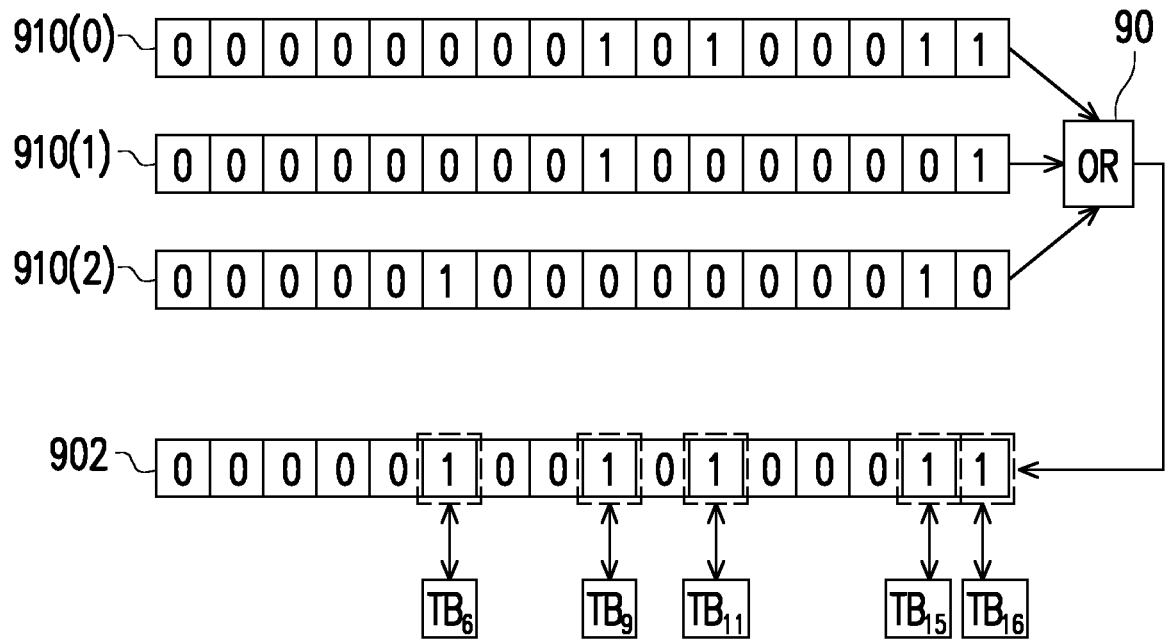

FIG. 9A and FIG. 9B are schematic diagrams for obtaining logical-to-physical mapping tables according to mapping information illustrated according to an exemplary embodiment of the disclosure.

Referring to FIGS. 7A to 7C and FIGS. 9A and 9B, examples are used to describe the data merge operation of the disclosure in more detail below. Referring to FIG. 7A, in the operation that the memory management circuit 502 selects the at least one first physical unit 710(0) to 710(2) and the at least one second physical unit 710(3) as the source node 701, it is assumed that, the data volume that the size of the at least one third physical unit 720(0) of the recycling node 702 can contain (i.e., the target data volume) is 100%; the data volume of the valid data in the first physical unit 710(0) of the selected source node 701 accounts for 20% of the target data volume; the data volume of the valid data in the first physical unit 710(1) accounts for 20% of the target data volume; the data volume of the valid data in the first physical unit 710(2) accounts for 37% of the target data volume; and the data volume of the valid data in the second physical unit 710(3) accounts for 60% of the target data volume. Here, the data volume of the valid data in each of the at least one first physical unit 710(0) to 710(2) is less than the data volume of the valid data in each of the at least one second physical unit 710(3).

Accordingly, the memory management circuit 502 reads the first mapping information shared by the at least one first physical unit 710(0) to 710(2) and the at least one second physical unit 710(3) from the rewritable non-volatile memory module 406. Referring to FIG. 7A and FIG. 9A together, it is assumed that table mapping information 910(0) (a.k.a. first table mapping information 910(0)) corresponds to the first physical unit 710(0); table mapping information 910(1) (a.k.a. first table mapping information 910(1)) corresponds to the first physical unit 710(1); table mapping information 910(2) (a.k.a. first table mapping information 910(2)) corresponds to the first physical unit 710(2); and table mapping information 910(3) (a.k.a. second table mapping information 910(3)) corresponds to the second physical unit 710(3). The table mapping information 910(0) to 910(3) all have 16 bits. The bits $b_1$ to $b_5$, $b_9$, $b_{11}$ and $b_{15}$ to $b_{16}$ in the first table mapping information 910(0) are 1, and reflect that the logical-physical mapping tables $TB_1$ to $TB_5$, $TB_9$, $TB_{11}$ and $TB_{15}$ to $TB_{16}$ may be queried to access the first physical unit 710(0). The bits $b_1$ to $b_5$, $b_9$ and $b_{16}$ in the first table mapping information 910(1) are 1, and reflect that the logical-physical mapping tables $TB_1$ to $TB_5$, $TB_9$ and $TB_{16}$ may be queried to access the first physical unit 710(1). The bits $b_1$ to $b_2$, $b_4$ to $b_6$ and $b_{15}$ in the first table mapping information 910(2) are 1, and reflect that the logical-physical mapping tables $TB_1$ to $TB_2$, $TB_4$ to $TB_6$ and $TB_{15}$ may be queried to access the first physical unit 710(2). In addition, the bits $b_1$ to $b_6$, $b_9$, $b_{11}$ and $b_{15}$ to $b_{16}$ in the second table mapping information 910(3) are 1, and reflect that the logical-physical mapping tables $TB_1$ to $TB_6$, $TB_9$, $TB_{11}$ and $TB_{15}$ to $TB_{16}$ may be queried to access the second physical unit 710(3). After a logical module 90 performs an OR operation on the table mapping information 910(0) to 910(3), first mapping information 901 shared by the at least one first physical unit 710(0) to 710(2) and the at least one second physical unit 710(3) can be obtained. The memory management circuit 502 may load in the logical-physical mapping tables $TB_1$ to $TB_6$, $TB_9$, $TB_{11}$ and $TB_{15}$ to $TB_{16}$ shared by the at least one first physical unit 710(0) to 710(2) and the at least one second physical unit 710(3) according to the first mapping information 901.

Next, according to the first mapping information 901 (or the logical-physical mapping tables $TB_1$ to $TB_6$, $TB_9$, $TB_{11}$ and $TB_{15}$ to $TB_{16}$), the memory management circuit 502 can copy the valid data 700A collected from the at least one first physical unit 710(0) to 710(2) and the at least one second physical unit 710(3) of the source node 701 to the at least one third physical unit 720(0) of the recycling node 702. Here, the valid data 700A includes the valid data from the at least one first physical unit 710(0) to 710(2) and the valid data from the at least one second physical unit 710(3).

In particular, in this exemplary embodiment of the disclosure, when the data volume of the valid data copied from the at least one second physical unit 710(3) of the source node 701 to the at least one third physical unit 720(0) of the recycling node 702 reaches the data volume threshold, the memory management circuit 502 stops collecting the valid data from the at least one second physical unit 710(3), and continues collecting the valid data from the at least one first physical unit 710(0) to 710(2). Specifically, the data volume threshold is the remaining data volume obtained by subtracting the total data volume of the valid data in the at least one first physical unit 710(0) to 710(2) from the target data volume (i.e., the data volume that the size of the at least one third physical unit 720(0) can contain). In this exemplary embodiment, the remaining data volume is 23% (i.e., 100%−(20%+20%+37%)=23%), and the memory management circuit 502 will set this remaining data volume (i.e., 23%) as the data volume threshold. In other words, when the data volume of the valid data copied from the at least one second physical unit 710(3) of the source node 701 to the at least one third physical unit 720(0) of the recycling node 702 accounts for 23% of the size of the at least one third physical unit 720(0), (i.e., equivalent to the data volume of the valid data copied from the at least one second physical unit 710(3) to the at least one third physical unit 720(0) reaching the data volume threshold), the memory management circuit 502 will no longer collect the valid data from the at least one second physical unit 710(3).

Referring to FIG. 7B, in this exemplary embodiment of the disclosure, when the data volume of the valid data copied from the at least one second physical unit 710(3) to the at least one third physical unit 720(0) reaches the data volume threshold (i.e., 23%), the data volume of the valid data remaining in the at least one second physical unit 710(0) is reduced to account for 37% of the target data volume (i.e., 60%−23%=37%). In particular, at this point in time, parts of the valid data in the at least one first physical unit 710(0) to 710(2) are already copied to the at least one third physical unit 720(0) of the recycling node 702. For example, the valid data remaining in the first physical unit 710(0) is reduced to account for 10% of the target data volume; the valid data remaining in the first physical unit 710(1) is reduced to account for 10% of the target data volume; and the valid data remaining in the first physical unit 710(2) is reduced to account for 27% of the target data volume.

As described above, when the data volume of valid data copied from the at least one second physical unit 710(3) to the at least one third physical unit 720(0) reaches the data volume threshold (i.e., 23%), the memory management circuit 502 stops collecting the valid data from the at least one second physical unit 710(3), and continues collecting the valid data from the at least one first physical unit 710(0) to 710(2). Therefore, as shown in FIG. 7B, the memory management circuit 502 uses only the at least one first physical unit 710(0) to 710(2) as the source node 701, and reads mapping information (a.k.a. second mapping information) only corresponding to the at least one first physical unit 710(0) to 710(2) from the rewritable non-volatile memory module 406.

Referring to FIG. 7B and FIG. 9B together, in the operation that the memory management circuit 502 reads the second mapping information only corresponding to the at least one first physical unit 710(0) to 710(2) from the rewritable non-volatile memory module 406, parts of the valid data in the at least one first physical unit 710(0) to 710(2) are already copied to the at least one third physical unit 720(0) of the recycling node 702. Therefore, the table mapping information of the at least one first physical unit 710(0) to 710(2) is updated to the first table mapping information 910(0) to 910(2) as shown in FIG. 9B. For example, the updated first table mapping information 910(0) reflects that the logical-physical mapping tables $TB_9$, TB 11 and TB 15 to TB 16 may be queried to access the first physical unit 710(0); the updated first table mapping information 910(1) reflects that the logical-physical mapping tables $TB_9$ and $TB_{16}$ may be queried to access the first physical unit 710(1); and the updated first table mapping information 910(2) reflects that the logical-physical mapping tables $TB_6$ and $TB_{15}$ may be queried to access the first physical unit 710(2). Similarly, the memory management circuit 502 can perform the OR operation on the table mapping information 910(0) to 910(3) through the logical module 90 to obtain second mapping information 902 of the at least one first physical unit 710(0) to 710(2). The memory management circuit 502 can load in only the logical-to-physical mapping tables $TB_6$, $TB_9$, $TB_{11}$ and $TB_{15}$ to $TB_{16}$ of the at least one first physical unit 710(0) to 710(2) according to the second mapping information 902. It can be seen that, before the data volume of the valid data copied from the at least one second physical unit 710(3) to the at least one third physical unit 720(0) reaches the data volume threshold, the number of the logical-to-physical mapping tables that the memory management circuit 502 needs to access is 10 (i.e., the logical-to-physical mapping tables $TB_1$ to $TB_6$, $TB_9$, $TB_{11}$ and $TB_{15}$ to $TB_{16}$). After the data volume of the valid data copied from the at least one second physical unit 710(3) to the at least one third physical unit 720(0) reaches the data volume threshold, the number of the logical-to-physical mapping tables that the memory management circuit 502 needs to access is 5 (i.e., the logical-to-physical mapping tables $TB_6$, $TB_9$, $TB_{11}$ and $TB_{15}$ to $TB_{16}$).

Next, according to the second mapping information 902 (or the logical-physical mapping tables $TB_6$, $TB_9$, $TB_{11}$ and $TB_{15}$ to $TB_{16}$), the memory management circuit 502 can copy the valid data collected from the at least one first physical unit 710(0) to 710(2) of the source node 701 to the at least one third physical unit 720(0) of the recycling node 702. Here, valid data 700B includes the valid data from the at least one first physical unit 710(0) to 710(2).

Referring to FIGS. 7A to 7C, in this exemplary embodiment of the disclosure, the data volume threshold is the remaining data volume obtained by subtracting the total data volume of the valid data in the at least one first physical unit 710(0) to 710(2) from the data volume that the size of the at least one third physical unit 720(0) of the recycling node 702 can contain (i.e., the target data volume), and the space corresponding to the remaining data volume in the at least one third physical unit 720(0) is used to store the valid data in the at least one second physical unit 710(3). Therefore, the other space not corresponding to the remaining data volume in the at least one third physical unit 720(0) is just enough to store all the valid data in the at least one first physical unit 710(0) to 710(2). That is to say, as shown in FIG. 7A, the valid data in the first physical unit 710(0) accounting for 20% of the target data volume, the valid data in the first physical unit 710(1) accounting for 20% of the target data volume and the valid data in the first physical unit 710(2) accounting for 37% of the target data volume may all be copied to the at least one third physical unit 720(0) of the recycling node 702 as shown by FIG. 7C.

Figure 10A:
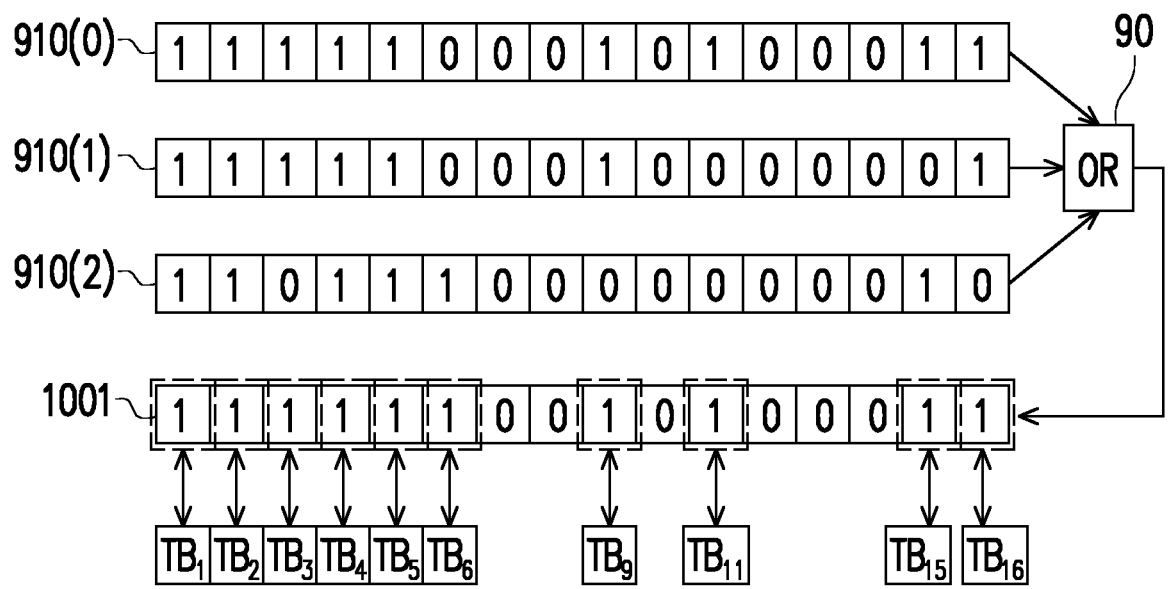
FIG. 10A and FIG. 10B are schematic diagrams for obtaining logical-to-physical mapping tables according to a conventional data merge operation illustrated according to an exemplary embodiment of the disclosure.
Figure 10B:
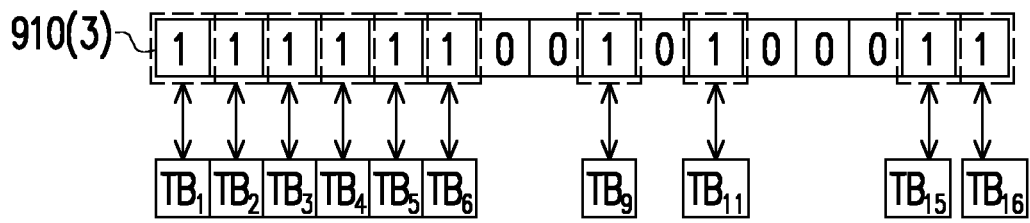

FIG. 10A and FIG. 10B are schematic diagrams for obtaining logical-to-physical mapping tables according to a conventional data merge operation illustrated according to an exemplary embodiment of the disclosure.

The difference between the conventional data merge operation and the data merge operation of the disclosure will be described below with reference to FIG. 7A and FIGS. 10A to 10B. In the conventional data merge operation, the memory management circuit 502 performs the data merge operation on the physical units 710(0) to 710(2) storing less valid data in the source node 701 to copy all the valid data in the physical units 710(0) to 710(2) storing less valid data to the physical unit 720(0) of the recycling node 702 and then copy the valid data from the physical unit 710(3) storing more valid data in the source node 701 to a remaining space of the physical unit 720(0) in the recycling node 702. Therefore, as shown in FIG. 10A, the memory management circuit 502 loads in only the logical-physical mapping tables $TB_1$ to $TB_6$, $TB_9$, $TB_{11}$ and TB 15 to TB 16 of the physical units 710(0) to 710(2) according to mapping information 1001 of the physical units 710(0) to 710(2), and copies the valid data from the physical units 710(0) to 710(2) to the physical unit 720(0) of the recycling node 702 according to the logical-to-physical mapping tables $TB_1$ to $TB_6$, $TB_9$, $TB_{11}$ and $TB_{15}$ to $TB_{16}$. Next, the memory management circuit 502 loads in the logical-physical mapping tables $TB_1$ to $TB_6$, $TB_9$, $TB_{11}$ and $TB_{15}$ to $TB_{16}$ of the physical unit 710(3) according to the mapping information 910(3) of the physical unit 710(3) storing more valid data, and copies the valid data from the physical unit 710(3) to the remaining space of the physical unit 720(0) in the recycling node 702 according to the logical-to-physical mapping tables $TB_1$ to $TB_6$, $TB_9$, $TB_{11}$ and $TB_{15}$ to $TB_{16}$. It can be seen that, in the case where the logical-physical mapping tables required for accessing the physical units 710(0) to 710(2) storing less valid data and the logical-physical mapping tables required for accessing the physical unit 710(3) storing more valid data are duplicate logical-physical mapping tables, the number of the logical-physical mapping tables that the memory management circuit 502 needs to access is 10 (i.e., the logical-physical mapping tables $TB_1$ to $TB_6$, $TB_9$, $TB_{11}$ and $TB_{15}$ to $TB_{16}$) in two-stage operation the conventional data merge operation. However, in the foregoing exemplary embodiment of the disclosure, after the data volume of the valid data copied from the physical unit 710(3) to the physical unit 720(0) of the recycling node 702 reaches the data volume threshold, the number of the logical-physical mapping tables that the memory management circuit 502 needs to access may be reduced to 5, which is less than the 10 logical-physical mapping tables to be accessed in the conventional data merge operation.

To describe in more detail that the performance improvement of the memory storage device can be achieved by the data merge method of the disclosure by reducing the number of logical-physical mapping tables that need to be loaded in the data merge operation, it is assumed below that each time the memory management circuit 502 can process 1000 logical-physical mapping tables in one data merge operation. Referring to FIG. 7A to FIG. 7C again, in FIG. 7A, it is assumed that the number of the logical-physical mapping tables required for accessing the valid data in the at least one first physical unit 710(0) to 710(2) is 6000, and the logical-physical mapping tables required for accessing the valid data in the at least one second physical unit 710(3) are also the same duplicate 6000 tables. Accordingly, in the operation that the memory management circuit 502 reads the first mapping information shared by the at least one first physical unit 710(0) to 710(2) and the at least one second physical unit 710(3) from the rewritable non-volatile memory module 406, the number of the logical-physical mapping tables shared by the at least one first physical unit 710(0) to 710(2) and the at least one second physical unit 710(3) obtained is 6000. Then, according to the 6000 logical-to-physical mapping tables, the memory management circuit 502 copies the valid data 700A collected from the at least one first physical unit 710(0) to 710(2) and the at least one second physical unit 710(3) of the source node 701 to the at least one third physical unit 720(0) of the recycling node 702. It is assumed that the data volume of the valid data copied to from the at least one second physical unit 710(3) of the source node 701 to the at least one third physical unit 720(0) of the recycling node 702 can reach the data volume threshold after 3000 logical-to-physical mapping tables are processed by the memory management circuit 502. At this time, it is equivalent to that the memory management circuit 502 has performed the data merge operation 3 times, and only 3000 (6000–3000=3000) logical-to-physical mapping tables are left to be processed. In other words, in FIG. 7B to FIG. 7C, the logical-physical mapping tables corresponding the at least one first physical unit 710(0) to 710(2) read by the memory management circuit 502 from the rewritable non-volatile memory module 406 are the remaining 3000 tables described above. Accordingly, the memory management circuit 502 can copy all the valid data remaining in the at least one first physical unit 710(0) to 710(2) of the source node 701 to the at least one third physical unit 720(0) of the recycling node 702 simply by performing the data merge operation 3 more times. In other words, in this exemplary embodiment of the disclosure, simply by performing the data merge operation 6 times, the memory management circuit 502 can copy all the valid data from the at least one first physical unit 710(0) to 710(2) of the source node 701 to the at least one third physical unit 720(0) of the recycling node 702 and copy the valid data having the remaining data volume corresponding to the data volume threshold in the at least one second physical unit 710(3) to the at least one third physical unit 720(0) of the recycling node 702.

Conversely, in the conventional data merge operation, under the aforementioned assumptions, because the memory management circuit 502 needs to ensure that all the valid data in the physical units 710(0) to 710(2) storing less valid data are all copied to the physical unit 720(0) of the recycling node 702, the memory management circuit 502 first performs the data merge operation on only the physical units 710(0) to 710(2) storing less valid data in the source node 701. That is, the memory management circuit 502 needs to finish processing 6000 logical-to-physical mapping tables corresponding to the physical units 710(0) to 710(2) so that all the valid data of the physical units 710(0) to 710(2) can be copied to the physical unit 720(0) of the recycling node 702. At this time, it is equivalent to that the memory management circuit 502 has performed the data merge operation 6 times. After that, the memory management circuit 502 processes 6000 logical-to-physical mapping tables corresponding to the physical unit 720(0) to copy the valid data from the physical unit 710(3) to the remaining space of the physical unit 720(0) in the recycling node 702. At this time, the memory management circuit 502 has also performed the data merge operation 6 times. That is to say, in the conventional data merge method, the memory management circuit 502 performs the data merge operation 12 times in total.

Accordingly, with the mechanism of setting the data volume threshold value in the data merge operation of the disclosure, not only can the number of logic-to-physical mapping tables that need to be loaded in the data merge operation be reduced, the number of times the memory management circuit performs the data merge operation can also be reduced when the number of the logic-to-physical mapping tables corresponding to the source node is huge and the repetition rate is high. As a result, the number of times the rewritable non-volatile memory module 406 of FIG. 4 is accessed can be effectively reduced, and the overall operating performance of the memory storage device can be improved.

Figure 11:
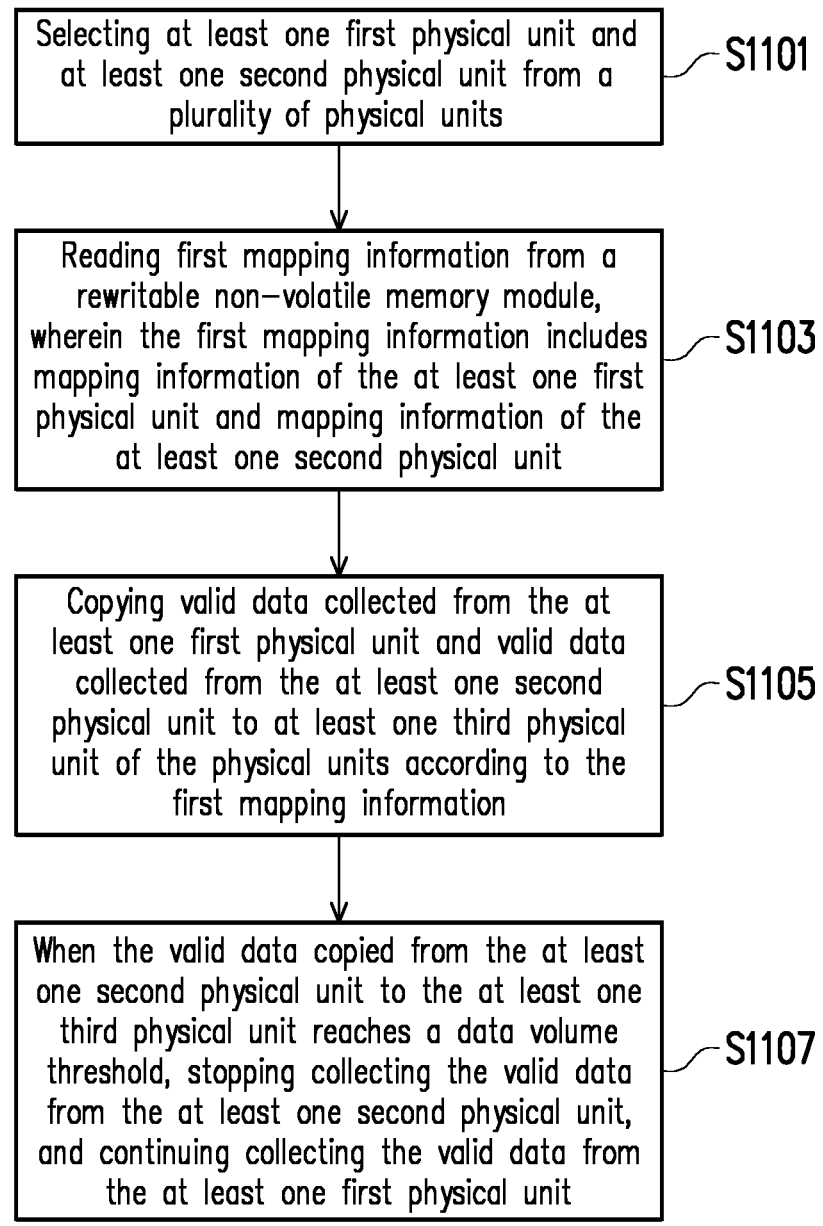
FIG. 11 is a flowchart illustrating a data merge method according to an exemplary embodiment of the disclosure.

FIG. 11 is a flowchart illustrating a data merge method according to an exemplary embodiment of the disclosure. Referring to FIG. 11, in step S1101, the memory management circuit 502 selects at least one first physical unit and at least one second physical unit from the physical units. In step S1103, the memory management circuit 502 reads first mapping information from the rewritable non-volatile memory module, wherein the first mapping information includes mapping information of the at least one first physical unit and mapping information of the at least one second physical unit. In step S1105, the memory management circuit 502 copies valid data collected from the at least one first physical unit and valid data collected from the at least one second physical unit to at least one third physical unit of the physical units according to the first mapping information. In step S1107, when a data volume of the valid data copied from the at least one second physical unit to the at least one third physical unit reaches a data volume threshold, the memory management circuit 502 stops collecting the valid data from the at least one second physical unit, and continues collecting the valid data from the at least one first physical unit.

Nevertheless, steps depicted in FIG. 11 are described in detail as above so that related description thereof is omitted hereinafter. It should be noted that, the steps depicted in FIG. 11 may be implemented as a plurality of program codes or circuits, which are not particularly limited in the disclosure. Moreover, the method disclosed in FIG. 11 may be implemented by reference with above exemplary embodiments, or may be implemented separately, which are not particularly limited in the disclosure.

In summary, according to the data merge method, the memory storage device and the memory control circuit unit proposed in the exemplary embodiments of the disclosure, the data volume threshold is set to limit the data volume of the valid data copied from the physical unit with relatively large volume in the source node to the recycling node, so that the logical-to-physical mapping tables used for accessing the source node in the data consolidation operation are not read as duplicates. In this way, the number of times the memory storage device is accessed in the data merge operation can be effectively reduced, thereby extending the service life of the memory storage device. In particular, when the number of logic-to-physical mapping tables corresponding to the source node is large and the repetition rate is high, the data merge method of the disclosure can reduce the number of the logic-to-physical mapping tables that needs to be loaded in the data merge operation and the number of times the memory management circuit performs the data merge operation, thereby improving the overall operating performance of the memory storage device.

The previously described exemplary embodiments of the present disclosure have the advantages aforementioned, wherein the advantages aforementioned not required in all versions of the present disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A data merge method for a rewritable non-volatile memory module, wherein the rewritable non-volatile memory module comprises a plurality of physical units, and the data merge method comprises:

selecting at least one first physical unit and at least one second physical unit from the physical units;

reading first mapping information from the rewritable non-volatile memory module, wherein the first mapping information comprises mapping information of the at least one first physical unit and mapping information of the at least one second physical unit;

copying valid data collected from the at least one first physical unit and valid data collected from the at least one second physical unit to at least one third physical unit of the physical units according to the first mapping information; and when a data volume of the valid data copied from the at least one second physical unit to the at least one third physical unit reaches a data volume threshold within the at least one third physical unit, stopping collecting the valid data from the at least one second physical unit, and continuing collecting the valid data from the at least one first physical unit.

2. The data merge method of claim 1, wherein a size of the at least one third physical unit is a target data volume, and the data volume threshold is a remaining data volume obtained by subtracting a total data volume of valid data in the at least one first physical unit from the target data volume.

3. The data merge method of claim 1, wherein a first data volume of the valid data collected from the at least one first physical unit is equal to a total data volume of valid data in the at least one first physical unit, and a second data volume of the valid data collected from the at least one second physical unit is less than a total data volume of valid data in the at least one second physical unit.

4. The data merge method of claim 2, wherein a sum of the first data volume and the second data volume is the size of the at least one third physical unit.

5. The data merge method of claim 1, wherein a step after reading the first mapping information from the rewritable non-volatile memory module comprises:

identifying valid data in the at least one first physical unit and valid data in the at least one second physical unit according to the first mapping information, wherein a data volume of valid data in each of the at least one first physical unit is less than a data volume of valid data in each of the at least one second physical unit.

6. The data merge method of claim 1, wherein when the data volume of the valid data copied from the at least one second physical unit to the at least one third physical unit reaches the data volume threshold, the step of stopping collecting the valid data from the at least one second physical unit, and continuing collecting the valid data from the at least one first physical unit comprises:

reading second mapping information from the rewritable non-volatile memory module, wherein the second mapping information comprises the mapping information of the at least one first physical unit; and copying the valid data collected from the at least one first physical unit to the at least one third physical unit of the physical units according to the second mapping information.

7. The data merge method of claim 1, wherein first table mapping information reflects that the mapping information of the at least one first physical unit is recorded in at least one first logical-to-physical mapping table, and second table mapping information reflects that the mapping information of the at least one second physical unit is recorded in at least one second logical-to-physical mapping table, wherein the step of reading the first mapping information from the rewritable non-volatile memory module comprises:

reading the first mapping information according to the first table mapping information and the second table mapping information, wherein the first mapping information reflects overlapping information between the at least one first logical-to-physical mapping table and the second logical-to-physical mapping table.

8. A memory storage device, comprising:

a connection interface unit, configured to couple to a host system;

a rewritable non-volatile memory module, wherein the rewritable non-volatile memory module comprises a plurality of physical units; and a memory control circuit unit, coupled to the connection interface unit and the rewritable non-volatile memory module, wherein the memory control circuit unit is configured to select at least one first physical unit and at least one second physical unit from the physical units;

the memory control circuit unit is further configured to read first mapping information from the rewritable non-volatile memory module, wherein the first mapping information comprises mapping information of the at least one first physical unit and mapping information of the at least one second physical unit, the memory control circuit unit is further configured to copy valid data collected from the at least one first physical unit and valid data collected from the at least one second physical unit to at least one third physical unit of the physical units according to the first mapping information, and when a data volume of the valid data copied from the at least one second physical unit to the at least one third physical unit reaches a data volume threshold within the at least one third physical unit, the memory control circuit unit is further configured to stop collecting the valid data from the at least one second physical unit, and continue collecting the valid data from the at least one first physical unit.

9. The memory storage device of claim 8, wherein a size of the at least one third physical unit is a target data volume, and the data volume threshold is a remaining data volume obtained by subtracting a total data volume of valid data in the at least one first physical unit from the target data volume.

10. The memory storage device of claim 8, wherein a first data volume of the valid data collected from the at least one first physical unit is equal to a total data volume of valid data in the at least one first physical unit, and a second data volume of the valid data collected from the at least one second physical unit is less than a total data volume of valid data in the at least one second physical unit.

11. The memory storage device of claim 10, wherein a sum of the first data volume and the second data volume is the size of the at least one third physical unit.

12. The memory storage device of claim 8, wherein an operation after reading the first mapping information from the rewritable non-volatile memory module comprises:

identifying valid data in the at least one first physical unit and valid data in the at least one second physical unit according to the first mapping information, wherein a data volume of valid data in each of the at least one first physical unit is less than a data volume of valid data in each of the at least one second physical unit.

13. The memory storage device of claim 8, wherein when the data volume of the valid data copied from the at least one second physical unit to the at least one third physical unit reaches the data volume threshold, the operation of stopping collecting the valid data from the at least one second physical unit, and continuing collecting the valid data from the at least one first physical unit comprises:

reading second mapping information from the rewritable non-volatile memory module, wherein the second mapping information comprises the mapping information of the at least one first physical unit; and copying the valid data collected from the at least one first physical unit to the at least one third physical unit of the physical units according to the second mapping information.

14. The memory storage device of claim 8, wherein first table mapping information reflects that the mapping information of the at least one first physical unit is recorded in at least one first logical-to-physical mapping table, and second table mapping information reflects that the mapping information of the at least one second physical unit is recorded in at least one second logical-to-physical mapping table, wherein the operation of reading the first mapping information from the rewritable non-volatile memory module comprises:

reading the first mapping information according to the first table mapping information and the second table mapping information, wherein the first mapping information reflects overlapping information between the at least one first logical-to-physical mapping table and the second logical-to-physical mapping table.

15. A memory control circuit unit for controlling a rewritable non-volatile memory module, wherein the rewritable non-volatile memory module comprises a plurality of physical units, wherein the memory control circuit unit comprises:

a host interface, configured to couple to a host system, a memory interface, configured to couple to the rewritable non-volatile memory module; and a memory management circuit, coupled to the host interface and the memory interface;

wherein the memory management circuit is configured to select at least one first physical unit and at least one second physical unit from the physical units;

the memory management circuit is further configured to read first mapping information from the rewritable non-volatile memory module, wherein the first mapping information comprises mapping information of the at least one first physical unit and mapping information of the at least one second physical unit, the memory management circuit is further configured to copy valid data collected from the at least one first physical unit and valid data collected from the at least one second physical unit to at least one third physical unit of the physical units according to the first mapping information, and when a data volume of the valid data copied from the at least one second physical unit to the at least one third physical unit reaches a data volume threshold within the at least one third physical unit, the memory management circuit is further configured to stop collecting the valid data from the at least one second physical unit, and continue collecting the valid data from the at least one first physical unit.

16. The memory control circuit unit of claim 15, wherein a size of the at least one third physical unit is a target data volume, and the data volume threshold is a remaining data volume obtained by subtracting a total data volume of valid data in the at least one first physical unit from the target data volume.

17. The memory control circuit unit of claim 15, wherein a first data volume of the valid data collected from the at least one first physical unit is equal to a total data volume of valid data in the at least one first physical unit, and a second data volume of the valid data collected from the at least one second physical unit is less than a total data volume of valid data in the at least one second physical unit.

18. The memory control circuit unit of claim 17, wherein a sum of the first data volume and the second data volume is the size of the at least one third physical unit.

19. The memory control circuit unit of claim 15, wherein an operation after reading the first mapping information from the rewritable non-volatile memory module comprises:

identifying valid data in the at least one first physical unit and valid data in the at least one second physical unit according to the first mapping information, wherein a data volume of valid data in each of the at least one first physical unit is less than a data volume of valid data in each of the at least one second physical unit.

20. The memory control circuit unit of claim 15, wherein when the data volume of the valid data copied from the at least one second physical unit to the at least one third physical unit reaches the data volume threshold, the operation of stopping collecting the valid data from the at least one second physical unit, and continuing collecting the valid data from the at least one first physical unit comprises:

reading second mapping information from the rewritable non-volatile memory module, wherein the second mapping information comprises the mapping information of the at least one first physical unit; and copying the valid data collected from the at least one first physical unit to the at least one third physical unit of the physical units according to the second mapping information.

21. The memory control circuit unit of claim 15, wherein first table mapping information reflects that the mapping information of the at least one first physical unit is recorded in at least one first logical-to-physical mapping table, and second table mapping information reflects that the mapping information of the at least one second physical unit is recorded in at least one second logical-to-physical mapping table, wherein the operation of reading the first mapping information from the rewritable non-volatile memory module comprises:

reading the first mapping information according to the first table mapping information and the second table mapping information, wherein the first mapping information reflects overlapping information between the at least one first logical-to-physical mapping table and the second logical-to-physical mapping table.

* * * * *